United States Patent
Kang et al.

(10) Patent No.: US 10,134,161 B2
(45) Date of Patent: Nov. 20, 2018

(54) METHOD AND APPARATUS FOR APPLYING GRAPHIC EFFECT IN ELECTRONIC DEVICE

(71) Applicant: Samsung Electronics Co., Ltd., Suwon-si, Gyeonggi-do (KR)

(72) Inventors: Jaehyeon Kang, Suwon-si (KR); Sejun Song, Seoul (KR); Youngeun Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/890,797

(22) PCT Filed: Jul. 10, 2014

(86) PCT No.: PCT/KR2014/006204
§ 371 (c)(1),
(2) Date: Nov. 12, 2015

(87) PCT Pub. No.: WO2015/005696
PCT Pub. Date: Jan. 15, 2015

(65) Prior Publication Data
US 2016/0086364 A1    Mar. 24, 2016

(30) Foreign Application Priority Data

Jul. 10, 2013    (KR) .................. 10-2013-0080880

(51) Int. Cl.
*G09G 5/02*    (2006.01)
*G06T 11/40*    (2006.01)
(Continued)

(52) U.S. Cl.
CPC .............. *G06T 11/40* (2013.01); *G06T 11/60* (2013.01); *G06T 11/80* (2013.01)

(58) Field of Classification Search
CPC .... G09G 5/02; G09G 5/06; G09G 2320/0666; G09G 2340/06; G06T 1/001
(Continued)

(56) References Cited

U.S. PATENT DOCUMENTS 6,201,549 B1    3/2001    Bronskill
6,768,488 B1 *  7/2004    Kotani .................... G06T 11/40
                                                            345/441
(Continued)

FOREIGN PATENT DOCUMENTS

CN    101075349 A    11/2007
CN    102737401 A    10/2012
(Continued)

OTHER PUBLICATIONS

Yotam I. Gingold et al: "A direct texture 1,9 placement and editing interface" Proceedings of the 19th Annual ACM Symposium on User Interface Software and Technology : October 15-18, 2006, Montreux, Switzerland, Jan. 1, 2006.
(Continued)

*Primary Examiner* — Ke Xiao
*Assistant Examiner* — Gordon Liu
(74) *Attorney, Agent, or Firm* — Jefferson IP Law, LLP

(57) ABSTRACT

A method for applying a graphic effect in an electronic device is provided. The method includes receiving an input of a filling line that indicates attribute information of a graphic effect to be applied to at least a partial area of an image displayed in a screen, identifying an attribute of the received filling line, and applying the graphic effect corresponding to the identified attribute of the filling line to at least the partial area of the image.

15 Claims, 9 Drawing Sheets

(51) Int. Cl.
*G06T 11/60* (2006.01)
*G06T 11/80* (2006.01)

(58) Field of Classification Search
USPC .......................................................... 345/589
See application file for complete search history.

(56) References Cited

U.S. PATENT DOCUMENTS

| | | | |
|---|---|---|---|
| 9,454,834 B2* | 9/2016 | Ohnishi | G06F 3/03545 |
| 2003/0085866 A1 | 5/2003 | Bimber et al. | |
| 2007/0216684 A1* | 9/2007 | Hsu | G06T 11/60 |
| | | | 345/441 |
| 2008/0212873 A1* | 9/2008 | Allen | G06T 9/20 |
| | | | 382/162 |
| 2009/0303199 A1* | 12/2009 | Cho | G06F 3/04883 |
| | | | 345/173 |
| 2010/0079373 A1 | 4/2010 | Ohnishi | |
| 2011/0185321 A1 | 7/2011 | Capela et al. | |

FOREIGN PATENT DOCUMENTS

| | | |
|---|---|---|
| JP | 2005-092588 A | 4/2005 |
| JP | 2006-053665 A | 2/2006 |
| JP | 2007-060325 A | 3/2007 |
| JP | 2012-018644 A | 1/2012 |
| KR | 10-0784831 B1 | 12/2007 |
| KR | 10-2009-0122806 A | 12/2009 |
| WO | 00/65461 | 11/2000 |

OTHER PUBLICATIONS

Seok-Hyung Bae et al: "I LoveSketch" Proceedings of the 21st Annual ACM Symposium on User Interface Software and Technology, UIST'08, Oct. 19-22, 2008, Monterey, California, USA, ACM Press, New York, New York, USA, Oct. 19, 2008.

Bret Jackson et al: "Nailing down multi-touch" May 28, 2012; May 28, 2012-2012, May 30, 2012, May 28, 2012.

\* cited by examiner

[Fig. 1]
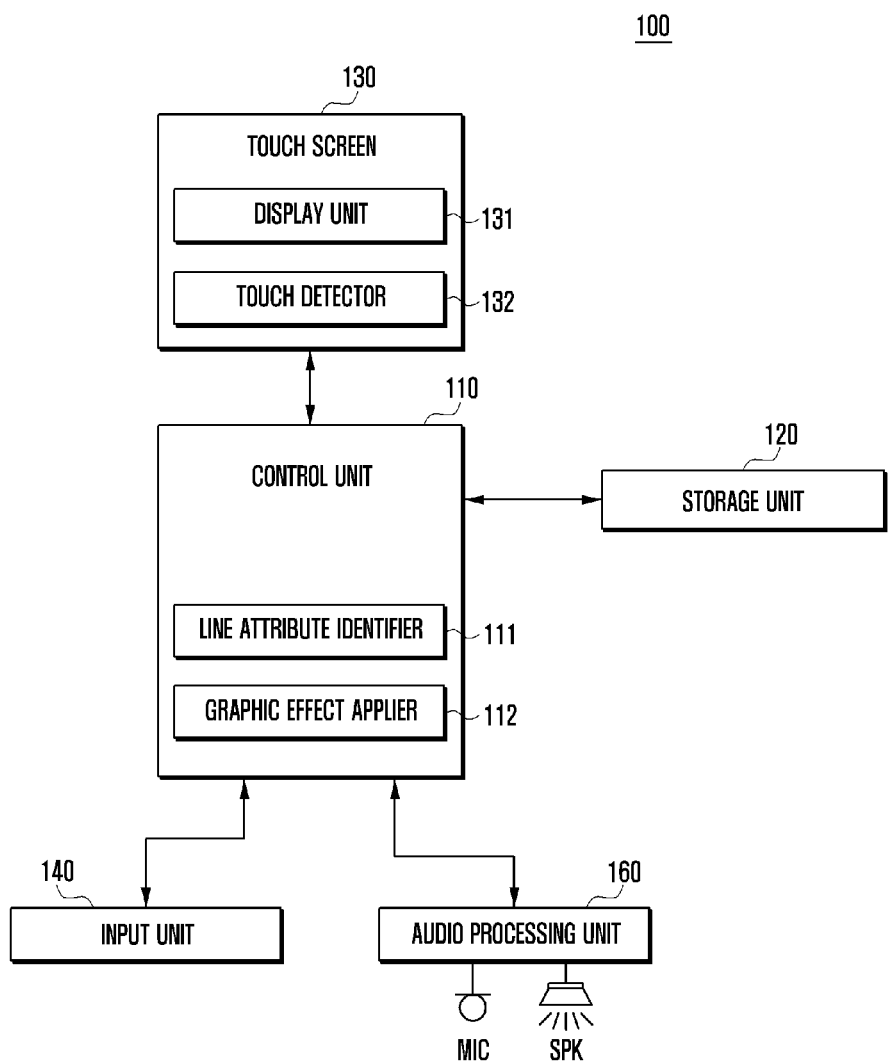
[Fig. 2]
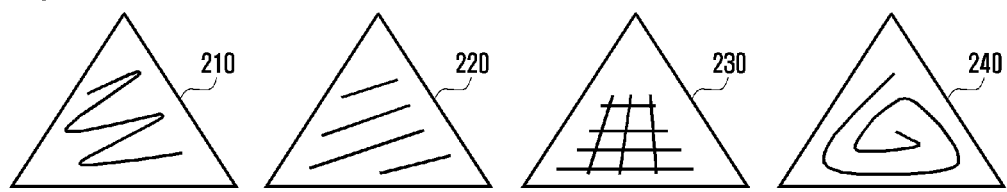

[Fig. 3]
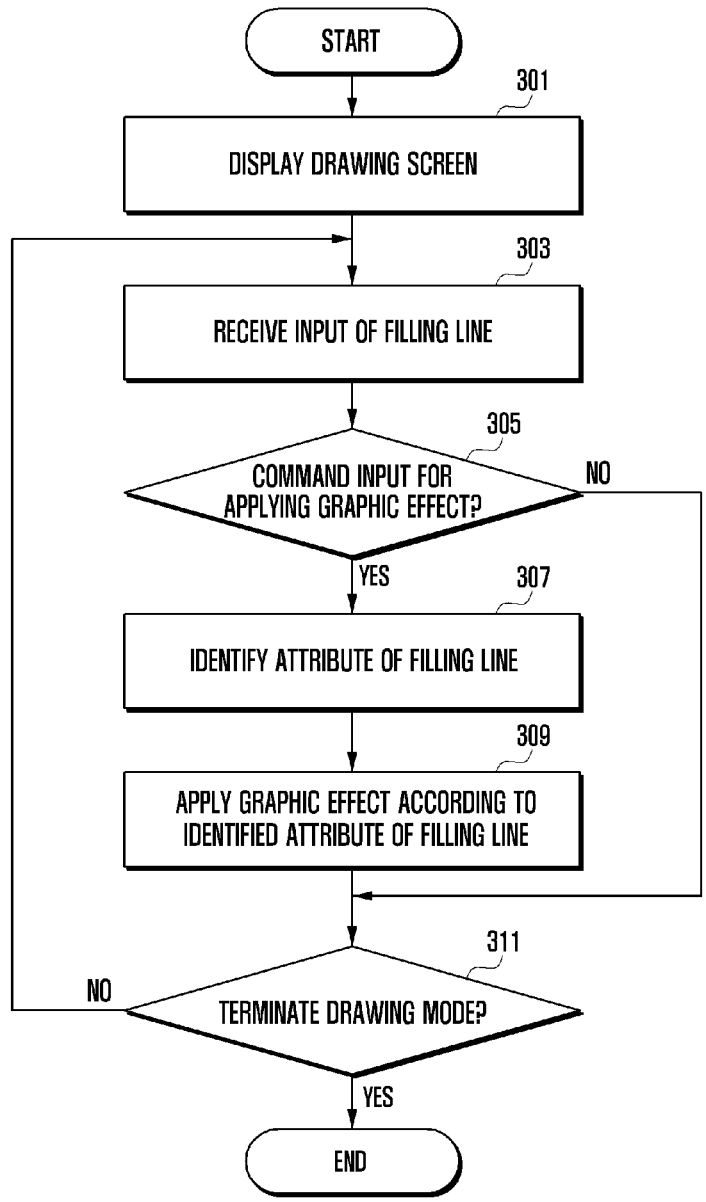

[Fig. 4]
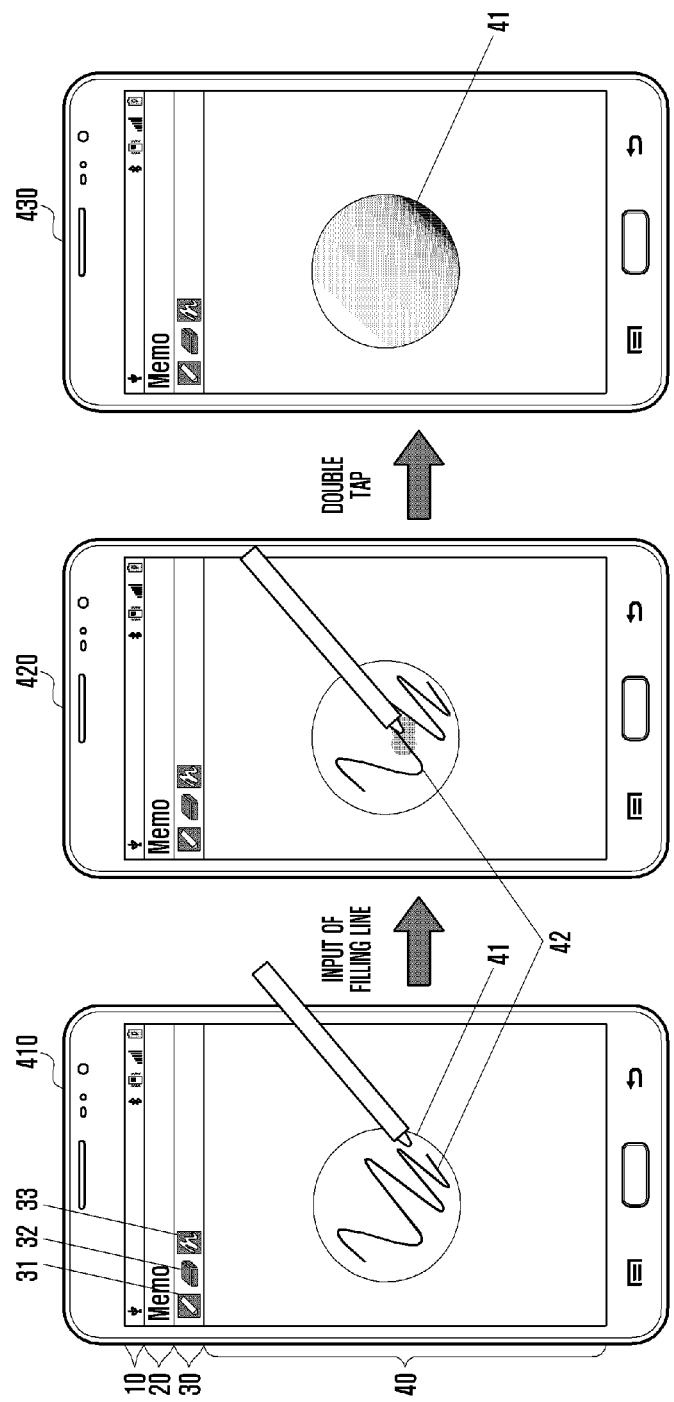

[Fig. 5]
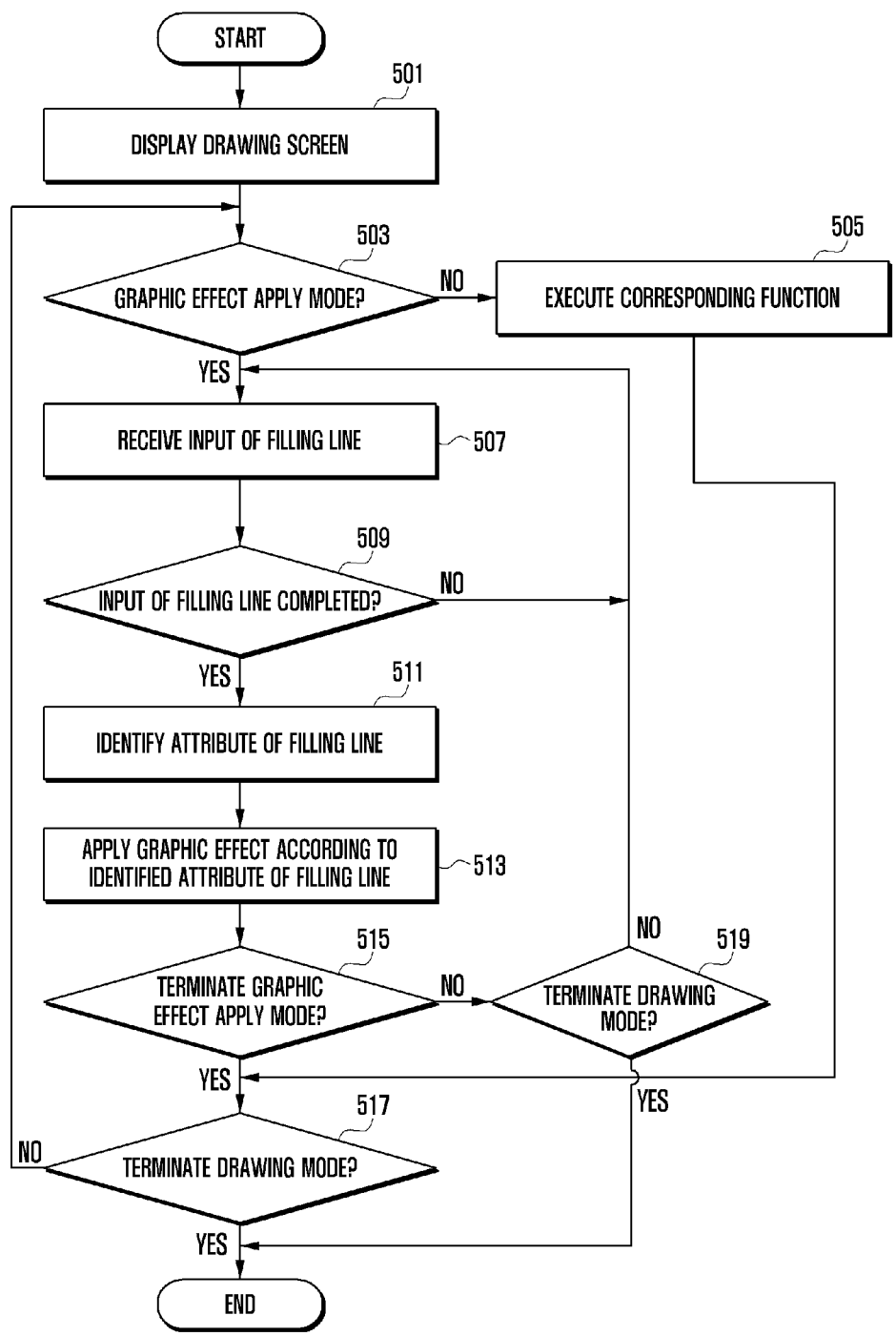

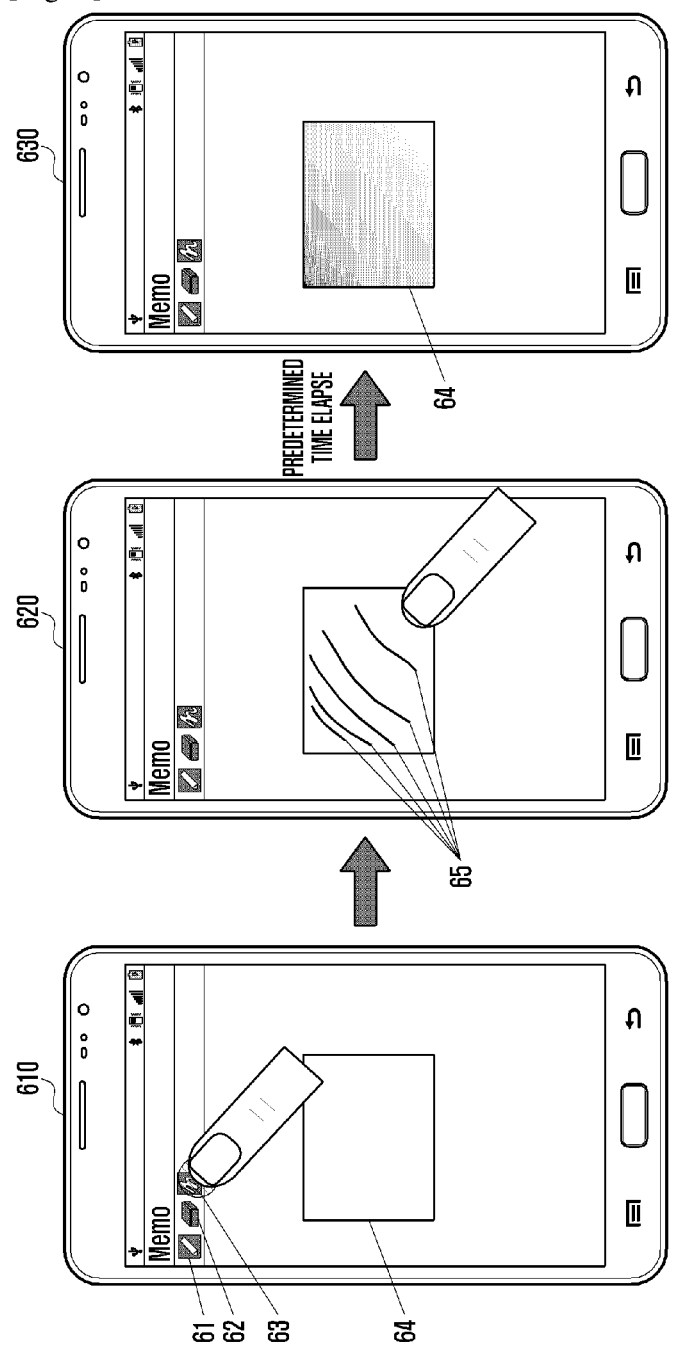
[Fig. 6]

[Fig. 7a]
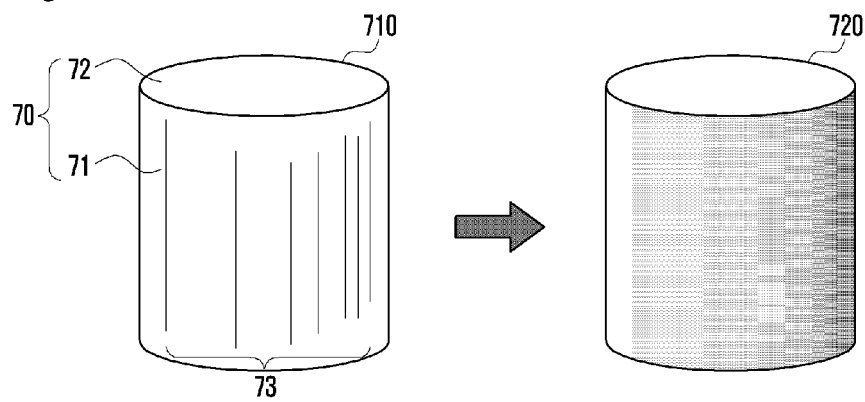
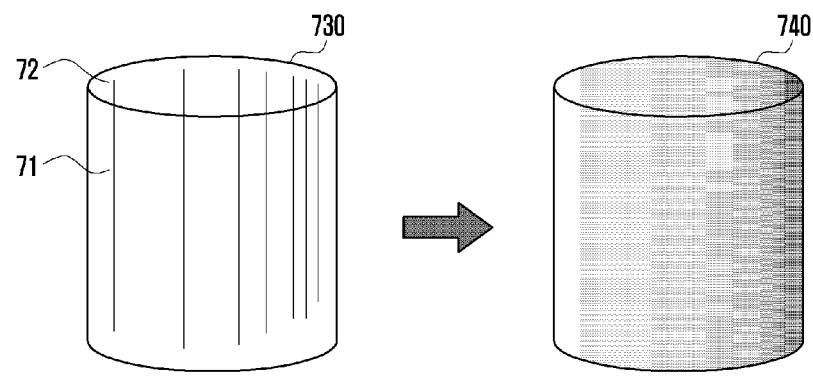

[Fig. 7b]
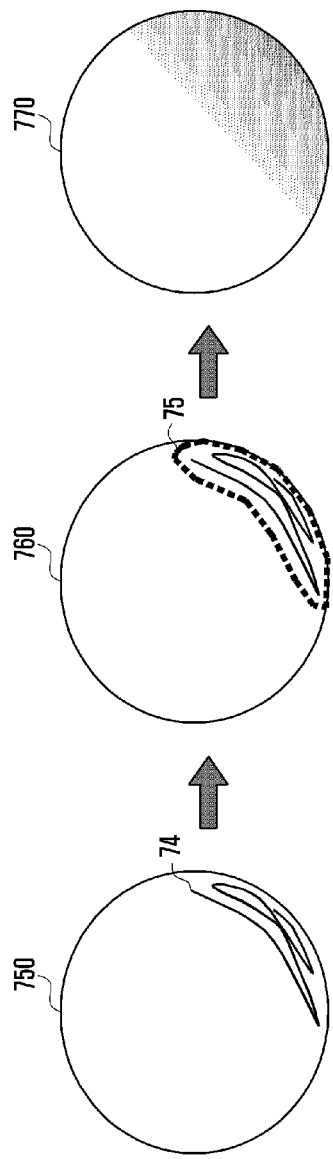
[Fig. 7c]
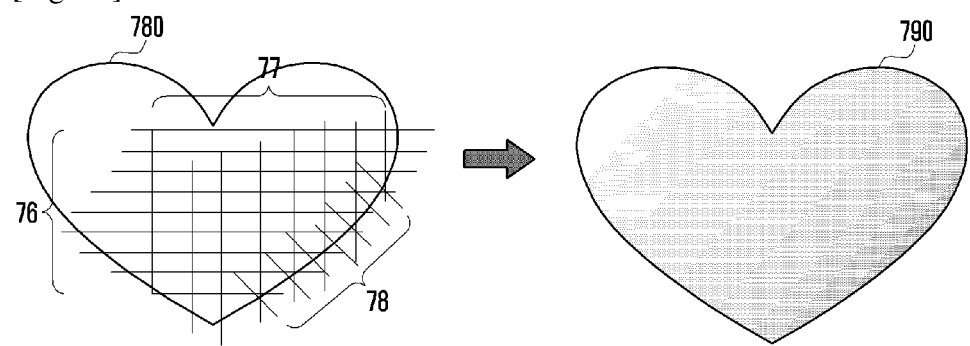

[Fig. 8]
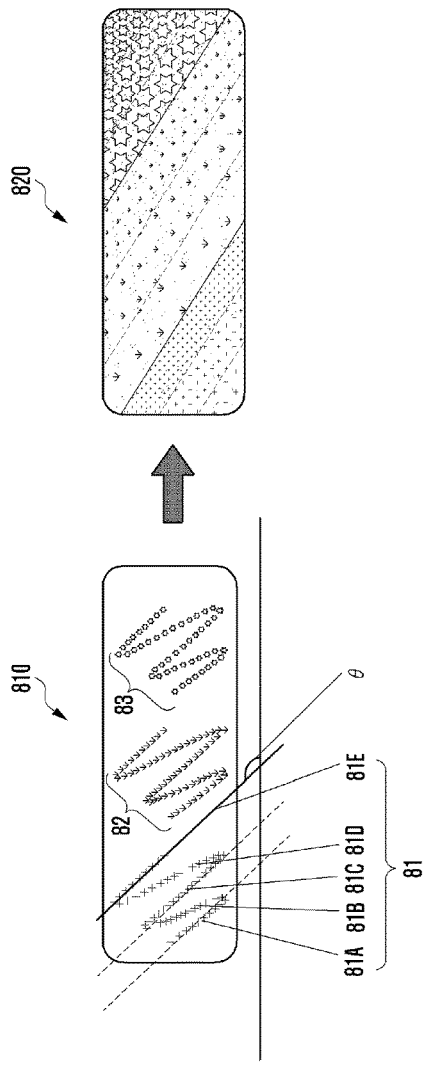
[Fig. 9a]
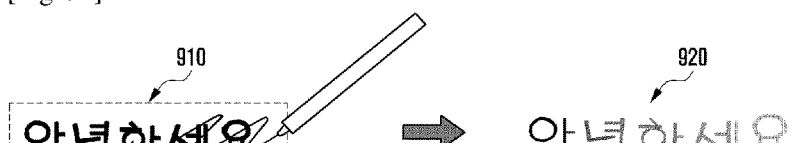
[Fig. 9b]
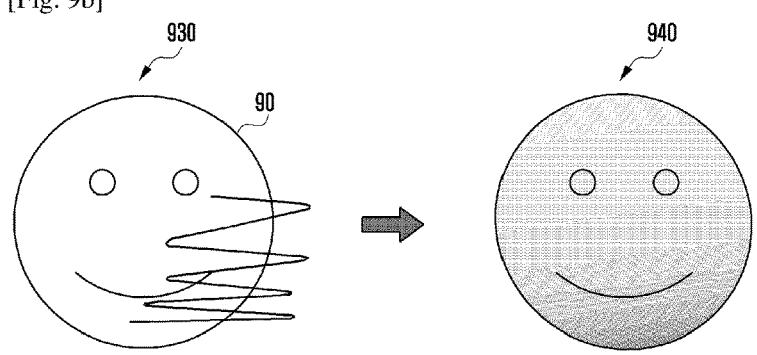

[Fig. 9c]
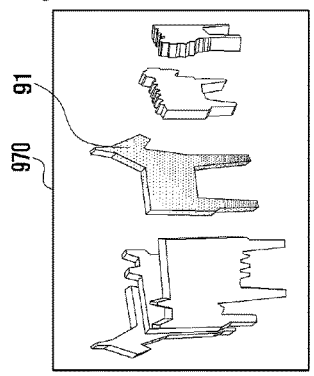
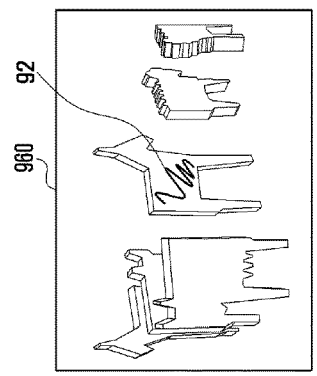
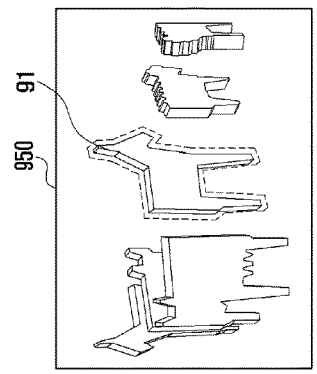
[Fig. 9d]
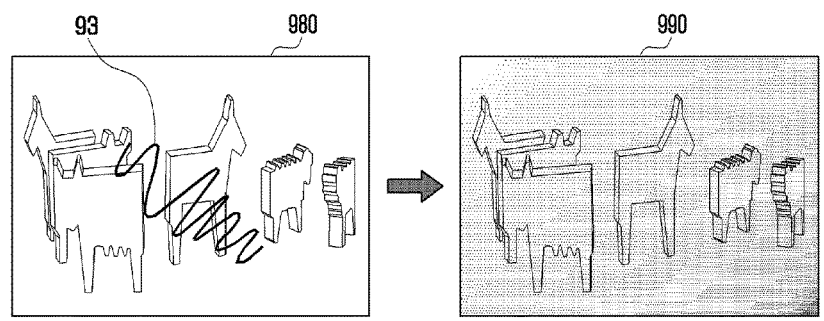

METHOD AND APPARATUS FOR APPLYING GRAPHIC EFFECT IN ELECTRONIC DEVICE

TECHNICAL FIELD

The present disclosure relates to a method and an apparatus for applying a graphic effect. More particularly, the present disclosure relates to a method and an apparatus for applying a graphic effect in an electronic device.

BACKGROUND ART

According to recent developments in information, communication, and semi-conductor technologies, the supply and usage of electronic devices are rapidly increasing. The electronic devices have become necessities for modern people, and various functions desired by users are being provided. For example, the electronic devices provide various functions such as a communication function, image photographing or video recording function, broadcast reception function, internet connection function, and map service function.

In the meantime, the electronic devices provide a drawing function. The drawing function includes various graphic effect functions such as a color painting, brightness control, and gradation control. For example, a user may apply graphic effects of filling a closed loop or an inner part of a figure with a specific color, and controls of brightness and gradation.

DISCLOSURE OF INVENTION

Technical Problem

However, the electronic devices in the related art have inconveniences because a plurality of operations must be performed to apply various graphic effects to the closed loop and the inner part of the figure. For example, a user of the electronic device in the related art may output a popup window by selecting a filling menu, and apply a graphic effect by setting various values of color, direction, angle, and transparency through sub menus included in the popup window. Like this, the method for applying a graphic effect in an electronic device according to the related art is unintuitive and ineffective, and thereby gives inconveniences to the user. Further, the method for applying a graphic effect in the related art is designed mainly for the electronic device having a big screen like a desktop computer, and is difficult to use on a mobile device having a relatively small size.

The above information is presented as background information only to assist with an understanding of the present disclosure. No determination has been made, and no assertion is made, as to whether any of the above might be applicable as prior art with regard to the present disclosure.

Solution to Problem

Aspects of the present disclosure are to address at least the above-mentioned problems and/or disadvantages and to provide at least advantages described below. Accordingly, an aspect of the present disclosure is to provide a method and an apparatus for applying a graphic effect.

In accordance with an aspect of the present disclosure, a method for applying a graphic effect in an electronic device is provided. The method includes receiving an input of a filling line that indicates attribute information of a graphic effect to be applied to at least a partial area of an image displayed in a screen, identifying an attribute of the received filling line, and applying the graphic effect corresponding to the identified attribute of the filling line to at least the partial area of the image.

In accordance with another aspect of the present disclosure, an apparatus for applying a graphic effect in an electronic device is provided. The apparatus includes a display unit configured to display an image, an input unit configured to input a filling line that indicates attribute information of a graphic effect to be applied to at least a partial area of the image, and a control unit configured to identify an attribute of the input filling line, and to apply the graphic effect corresponding to the attribute of the filling line to at least the partial area of the image.

In accordance with another aspect of the present disclosure, a non-transitory recording media readable by a computer loaded with a program configured to perform the above method is provided.

Other aspects, advantages, and salient features of the disclosure will become apparent to those skilled in the art from the following detailed description, which, taken in conjunction with the annexed drawings, discloses various embodiments of the present disclosure.

Advantageous Effects of Invention

As described above, according to various embodiments of the present disclosure, the method and apparatus for applying a graphic effect in an electronic device don't require a complicated procedure and can intuitively apply a graphic effect such as a brightness effect and a gradation effect to a whole image or a portion of objects, and thereby user conveniences are improved.

BRIEF DESCRIPTION OF DRAWINGS

The above and other aspects, features, and advantages of certain embodiment of the present disclosure will be more apparent from the following description taken in conjunction with the accompanying drawings, in which:

FIG. 1 is a block diagram illustrating a configuration of an electronic device according to an embodiment of the present disclosure;

FIG. 2 is a drawing illustrating types of filling lines according to an embodiment of the present disclosure;

FIG. 3 is a flowchart illustrating a method for providing a graphic effect in an electronic device according to an embodiment of the present disclosure;

FIG. 4 is a screen example illustrating a method for providing a graphic effect in an electronic device according to an embodiment of the present disclosure;

FIG. 5 is a flowchart illustrating a method for providing a graphic effect in an electronic device according to an embodiment of the present disclosure;

FIG. 6 is a screen example illustrating a method for providing a graphic effect in an electronic device according to an embodiment of the present disclosure;

FIGS. 7a, 7b, and 7c are screen examples illustrating a method for applying a brightness effect according to an embodiment of the present disclosure;

FIG. 8 is a screen example illustrating a method for applying a gradation effect according to an embodiment of the present disclosure;

FIG. 9a is a screen example illustrating a method for applying a graphic effect to a text according an embodiment of the present disclosure;

FIG. 9b is a screen example illustrating a method for applying a graphic effect to an icon according an embodiment of the present disclosure;

FIG. 9c is a screen example illustrating a method for applying a graphic effect to a partial object of an image according an embodiment of the present disclosure; and FIG. 9d is a screen example illustrating a method for applying a graphic effect to a whole image according an embodiment of the present disclosure.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some components in the accompanying drawings are emphasized, omitted, or schematically illustrated, and the size of each component does not fully reflect the actual size. Therefore, the present disclosure is not limited to the relative sizes and distances illustrated in the accompanying drawings.

An electronic device according to the present disclosure may be a mobile communication terminal, smart phone, tablet Personal Computer (PC), hand-held PC, Portable Multimedia Player (PMP), Personal Digital Assistant (PDA), notebook PC, or desktop PC.

Hereinafter, "filling line" indicates attribute information (or setting value) of a graphic effect for applying at least to a partial area of an image. The filling line may have various forms such as a zigzag line, plurality of parallel lines, cross line, and spiral line (refer to FIG. 2). Various embodiments of the present disclosure may apply a different graphic effect to an image according to a density, color, and slope of the filling line. For example, users of electronic devices according various embodiments of the present disclosure may easily apply a desired graphic effect to the image through a simple operation of inputting a color, density, and slope of the filling line.

FIG. 1 is a block diagram illustrating a configuration of an electronic device according to an embodiment of the present disclosure, and FIG. 2 is a drawing illustrating types of filling lines according to an embodiment of the present disclosure.

Referring to FIGS. 1 and 2, the electronic device 100 according to an embodiment of the present disclosure may include a control unit 110, storage unit 120, touch screen 130, an input unit 140, and audio processing unit 160. The touch screen 130 may include a display unit 131 and a touch detector 132, and the control unit 110 may include a line attribute identifier 111 and a graphic effect applier 112.

The audio processing unit 160 may be connected to a speaker SPK for outputting an audio signal transmitted or received in a communication, an audio signal included in a received message, and an audio signal of an audio file stored in the storage unit 120, and to a microphone MIC for collecting a user voice or other audio signals. The audio processing unit 160 according to an embodiment of the present disclosure can output various sound effects corresponding to a graphic effect through the Speaker (SPK).

The input unit 140 receives numeral or character information and may include a plurality of input keys and function keys for setting various functions. The function keys may include a direction key, side key, and shortcut key for performing a specific function. Further, the input unit 140 generates a key signal for a user setting and a function control of the electronic device 100, and transmits the key signal to the control unit 110. The input unit 140 may be formed with at least one of a QWERTY keypad, 3×4 keypad, 4×3 keypad, ball joystick, optical joystick, wheel key, touch key, touch pad, touch screen, mouse, keyboard, and their combination. In the meantime, if the electronic device 100 supports a full touch screen, the input unit 140 may include several function keys such as a volume key, power key, menu key, cancel key, and home key. The input unit 140 according to an embodiment of the present disclosure may generate input signals for activating or deactivating a drawing mode, activating or deactivating a brightness mode (a light and shade control mode, or a contrast adjustment mode) or a gradation mode, command for applying a graphic effect, and filling line, and transmit them to the control unit 110.

The touch screen 130 may perform both an input function and a display function. For this, the touch screen 130 may include a display unit 131 and a touch detector 132.

The display unit 131 displays information of various menus for the electronic device 100, information input by a user, or information to be provided for the user. The display unit 131 may be configured with a Liquid Crystal Display (LCD), Organic Light Emitted Diode (OLED), or Active Matrix Organic Light Emitted Diode (AMOLED). The display unit 131 may output various screens for the operation of the electronic device 100 such as a home screen, menu screen, web page screen, and communication screen. For example, the display unit 131 according to an embodiment of the present disclosure may display a drawing screen and a screen applied with a graphic effect through an input of filling line. Detailed description on the various screens will follow referring to screen examples.

The touch detector 132 is a device for providing an input function by generating a touch event if a touch input means such as a finger, stylus, and electronic pen contacts or approaches, and transmits the generated touch event to the control unit 110. In more detail, the touch detector 132 identifies a touch event through a change of physical properties (for example, capacitance and resistance) according to the contact or approach of the touch input means, and can transmit the type of generated touch event and touch location information to the control unit 110. The type of touch event may include a tap, touch movement (for example, drag and flick), long touch, double touch, and multi-touch.

The touch detector 132 detects one or more of various touch signals for controlling application of a graphic effect through an input of a filling line, and transmits the detected one or more touch signals to the control unit 110. The touch signal may include touch signals of activating or deactivating a drawing mode, activating or deactivating a brightness mode or a gradation mode, a command for applying a graphic effect, and detecting an input of filling line.

The storage unit 120 may store an Operating System (OS) of the electronic device 100, and application programs required for optional functions such as a sound play function, image or video play function, broadcasting play function, and internet connection function. Further, the storage unit 120 can store various data such as video data, game data, music data, movie data, and map data.

The storage unit 120 may include a program for controlling an application procedure of a graphic effect through an input of a filling line. The graphic effect control program may include a routine for activating and deactivating (on/off) a drawing mode, routine for activating and deactivating a graphic effect apply mode, routine for controlling an input of a filling line, line attribute identification routine for identifying an attribute of the input filling line, and a graphic effect apply routine for applying a graphic effect according to the identified attribute of the filling line. The line attribute identification routine may include a color calculation routine for extracting a color of a filling line, density calculation routine for calculating a density of a filling line, and slope calculation routine for calculating a slope of a filling line. The density calculation routine can calculate the density of a filling line by using distances between adjacent lines, overlapping of lines having different directions, or the number of lines per unit area.

The control unit 110 controls general operation of the electronic device 100 and signal flows between internal blocks of the electronic device 100, and may perform a data processing function. For example, the control unit 110 may be configured with a Central Processing Unit (CPU) and an Application Processor (AP). The control unit 110 may be configured with a single core processor or a multi-core processor.

The control unit 110 can control the procedure of applying a graphic effect by using a filling line. The control unit 110 may include a line attribute identifier 111 and a graphic effect applier 112.

The line attribute identifier 111 detects an input of a filling line, and identifies attribute information such as a color, density, and slope of the identified filling line. Referring to FIG. 2, the filling line may be formed variously. For example, the filling line may have a zigzag form as shown by reference number 210 of FIG. 2, parallel line form as shown by reference number 220, cross line form as shown by reference number 230, spiral form as shown by reference number 240, and any combination thereof. However, embodiments of the present disclosure are not limited to the examples shown in FIG. 2.

The line attribute identifier 111 may identify information of currently set pen color as color information of a filling line. The line attribute identifier 111 can identify a slope of a filling line. For example, if the filling line includes a plurality of parallel lines, the line attribute identifier 111 may identify an angle between a line perpendicular to the plurality of parallel lines and the horizontal line as a slope.

The line attribute identifier 111 can calculate a density from distances between adjacent lines. For example, the line attribute identifier 111 may identify a higher density as the distances between the adjacent lines become smaller. Alternatively, the line attribute identifier 111 may divide an input area of a filling line into a plurality of areas, and calculate the density by counting the number of lines in a divided unit area. For example, the line attribute identifier 111 may identify a higher density as the number of lines included in the unit area becomes great.

The graphic effect applier 112 can apply a graphic effect to at least one of a closed loop, text, icon, and partial area of an image according to attribute information identified by the line attribute identifier 111. The graphic effect may be one of a brightness effect and a gradation effect. More detailed descriptions on the method of applying a graphic effect will follow referring to screen examples.

Even though not shown in FIG. 1, the electronic device 100 may further include components having additional function such as a camera module for photographing an image/video or video communication, broadcast receiving module, digital sound play module, and internet communication module such as a Wi-Fi communication module. All the components cannot be listed here because the variation of components is great according to the trend of digital convergence, however the electronic device 100 according to the present disclosure may further include any component having the same level as the aforementioned components.

FIG. 3 is a flowchart illustrating a method for providing a graphic effect in an electronic device according to an embodiment of the present disclosure, and FIG. 4 is a screen example illustrating a method for providing a graphic effect in an electronic device according to an embodiment of the present disclosure.

Referring to FIGS. 3 and 4, the control unit 110 of the electronic device 100 according to an embodiment of the present disclosure controls the display unit 131 to display a drawing screen at operation 301. The drawing screen may be displayed when executing a drawing or writing program (or application) such as a memo, Photoshop, Painter, and Illustrator.

The control unit 110 receives at least one input of a filling line at operation 303. For example, the control unit 110 may receive an input of a filling line 42 in a zigzag form inside a circular image 41 of the drawing screen as shown by reference number 410 of FIG. 4. The drawing screen may include an indicator area 10, title area 20 for displaying a program name, drawing tool area 30, and drawing area 40. The indicator area 10 may display an intensity of a receiving signal, a residual battery amount, and time information. The title area 20 may display a name of a program being executed. The drawing tool area 30 may include a pen menu 31 for setting a pen type for drawing a picture, pen color, pen thickness, and transparency, an eraser menu 32 for erasing a picture, and a graphic effect apply menu 33 for commanding to apply a graphic effect. The graphic effect apply menu 33 may be a brightness menu (a light and shade menu, or a contrast menu) or a gradation menu. Hereinafter, an example of the brightness menu is described.

The control unit 110 identifies whether a command for applying a graphic effect is input at operation 305. The command for applying a graphic effect may be input when a predetermined touch event is generated. For example, the command for applying a graphic effect may be input through a double tap, gesture of a specific pattern, graphic effect apply menu 33, or predetermined key.

If the command for applying a graphic effect is not input at operation 305, the control unit 110 proceeds to operation 311, which is described further below. If the command for applying a graphic effect is input at operation 305, the control unit 110 proceeds to operation 307 and identifies the attribute of the received filling line. For example, the control unit 110 identifies the attribute of the received filling line 42, if a double tap touch event is generated as shown by reference number 420 of FIG. 4. In more detail, the control unit 110 may identify attribute information such as a density, slope (direction), and color through the line attribute identifier 111.

The control unit 110 applies the graphic effect corresponding to the identified attribute of the filling line at operation 309. For example, the control unit 110 may apply a brightness effect in the circular image 41 as shown by reference number 430 of FIG. 4. The control unit 110 may control the graphic effect applier 112 to apply a brightness effect so that the brightness decreases from the upper left to the lower right. This is because the density of filling line 42 becomes great from the upper left to the lower right.

The control unit 110 identifies whether termination of the drawing mode is requested at operation 311. If the termination of the drawing mode is not requested, the control unit 110 returns to operation 303. If the termination of the drawing mode is requested, the control unit 110 terminates the procedure of providing a graphic effect.

FIG. 5 is a flowchart illustrating a method for providing a graphic effect in an electronic device according to an embodiment of the present disclosure, and FIG. 6 is a screen example illustrating a method for providing a graphic effect in an electronic device according to an embodiment of the present disclosure.

Referring to FIGS. 5 and 6, the control unit 110 of the electronic device 100 according to another embodiment of the present disclosure controls the display unit 131 to display a drawing screen at operation 501. The drawing screen may be displayed when executing a drawing or writing program (or application) such as a memo, Photoshop, Painter, and Illustrator. The description on the drawing screen will be omitted because it has been already explained with reference to FIGS. 3 and 4.

The control unit 110 identifies whether the graphic effect apply mode is activated at operation 503. For example, the control unit 110 may identify whether a graphic effect apply menu 63 is touched as shown by reference number 610 of FIG. 6. However, the embodiment of the present disclosure is not limited to this. The graphic effect apply mode can be activated through various touch events (for example, a long touch event or a gestured of a specific pattern) or an input of predetermined key. The graphic effect apply mode may be one of a brightness effect mode or a gradation effect mode.

If the graphic effect apply mode is not activated at operation 503, the control unit 110 proceeds to operation 505 and performs a corresponding function, and then proceeds to operation 517, which is described further below. For example, the control unit 110 may set attributes of a pen (e.g., color, thickness, and transparency) through a pen menu 61, or erase a previous drawing through an eraser menu 62 according to a user's request.

If the graphic effect apply mode is activated at operation 503, the control unit 110 proceeds to operation 507 and receives an input of filling line. For example, the control unit 110 may receive a plurality of parallel lines 65 in a rectangle 64 of a screen as shown by reference number 620 of FIG. 6.

The control unit 110 identifies whether the input of the filling line is completed at operation 509. For example, the control unit 110 may decide that the input of filling line is completed, if a predetermined time (for example, 1 second) is elapsed since a touch is released. Alternatively, the control unit 110 may decide that the input of filling line is completed, if a predetermined touch event (for example, a double tap or a gesture of specific pattern) or a predetermined key is input.

If the input of filling line is not completed at operation 509, the control unit 110 returns to operation 507. If the input of filling line is completed at operation 509, the control unit 110 proceeds to operation 511 and identifies the attribute of the input filling line. For example, the line attribute identifier 111 of the control unit 110 may identify attribute information such as a color, slope, and density. If parallel lines 65 are not exactly parallel as shown by the screen of reference number 620, the line attribute identifier 111 measures the distances between the parallel lines 65 based on a plurality of points and identifies the density by calculating an average value of the distances.

The control unit 110 applies a graphic effect corresponding to the identified line attribute at operation 513. For example, the control unit 110 may apply a brightness effect in the rectangle 65 as shown by reference number 630 of FIG. 6. The rectangle 64 may be displayed brighter from the upper left to the lower right. This is because the distance becomes great from the upper left to the lower right.

The control unit 110 identifies whether the graphic effect apply mode is terminated at operation 515. If the graphic effect apply mode is terminated at operation 515, the control unit 110 proceeds to operation 517 and identifies whether the drawing mode is terminated. If the drawing mode is not terminated at operation 517, the control unit 110 returns to operation 503. If the drawing mode is terminated at operation 517, the control unit 110 terminates the procedure of providing a graphic effect.

If the graphic effect apply mode is not terminated at operation 515, the control unit 110 proceeds to operation 519 and identifies whether the drawing mode is terminated. If the drawing mode is not terminated at operation 519, the control unit 110 returns to operation 507. If the drawing mode is terminated at operation 519, the control unit 110 terminates the procedure of providing a graphic effect.

FIGS. 7a to 7c are screen examples illustrating a method for applying a brightness effect according to various embodiments of the present disclosure.

Referring to FIG. 7a, the control unit 110 according to an embodiment of the present disclosure may apply a graphic effect at least to a partial area of an image having a plurality of areas through a plurality of parallel lines 73. For example, if parallel lines 73 are located in the first area 71 and not in the second area 72 as shown in the drawing of reference number 710 of FIG. 7a, the control unit 110 may apply a brightness effect only to the first area 71 of the cylindrical image 70 as shown in the drawing of reference number 720. Here, the control unit 110 may express a different brightness according to the density (distances) of the parallel lines 73.

If the parallel lines 73 are located both in the first area 71 and the second area 72 as shown in the drawing of reference number 730 of FIG. 7a, the control unit 110 may apply the brightness effect both in the first area 71 and the second area 72 as shown in the drawing of reference number 740. Here, the control unit 110 may express a different brightness according to the density (distances) of the parallel lines 73.

When applying a graphic effect to an image divided into a plurality of areas, the embodiment of the present disclosure can selectively apply the graphic effect to a partial area, and thereby user conveniences are improved.

Secondly, referring to FIG. 7b, the control unit 110 according to another embodiment of the present disclosure may apply a graphic effect to a partial area of an image having only one area. For example, a user may input a filling line 74 at a side of a circular image as shown in the drawing of reference number 750. If the input of filling line 74 is received, the control unit 110 may divide an area 75 along the circumference of the filling line 74 as shown in the drawing of reference number 760. If the division of the area 75 is completed, the control unit 110 may apply a brightness effect to the divided area 75 as shown in the drawing of reference number 770.

When applying a graphic effect to an image having an area, the above embodiment of the present disclosure can selectively apply the graphic effect to a partial area, and thereby user conveniences are improved.

Lastly, referring to FIG. 7c, another embodiment of the present disclosure may apply a brightness effect to an image by over-painting. Namely, the embodiment of the present disclosure may apply the brightness effect by overlapping parallel line having different directions. For example, as shown in the drawing of reference number 780, a user may draw a plurality of parallel lines 76 in a heart image in a first direction (for example, a horizontal direction), a plurality of parallel lines 77 in a second direction (for example, a vertical direction), and a plurality of parallel lines 78 in a third direction (for example, a diagonal direction).

The control unit 110 may decrease the brightness by identifying a higher density as the number of overlapping lines in a plurality of direction becomes great. For example, the lower right part of the heart image may be displayed darker as shown in the drawing of reference number 790.

The above embodiment of the present disclosure may change the density by overlapping parallel lines in a plurality of directions, and change the brightness corresponding to the change of density.

FIG. 8 is a screen example illustrating a method for applying a gradation effect according to an embodiment of the present disclosure.

Referring to FIG. 8, the embodiment of the present disclosure may apply a gradation effect by inputting filling lines having a plurality of colors in a partial area of an image. For example, a user may sequentially input a filling line 81 having a first color (for example, sky blue), a filling line 82 having a second color (for example, red), and a filling line 83 having a third color (for example, black) on an image to be applied with a gradation effect as shown in the drawing of reference number 810 of FIG. 8. If the inputs of filling lines 81, 82, and 83 that respectively have the first to third colors is completed, the control unit 110 may apply a gradation effect gradually changing in the order of the first color (sky blue), second color (red), and third color (black) to the image as shown in the drawing of reference number 820. Here, the direction of gradation is perpendicular to the average slope of the first filling line 81, and the first to third colors may change based on the boundaries of the filling line 81 to the filling line 83.

For the calculation of the average slope of the first filling line 81, the first filling line 81 may divided into 5 lines of 81A, 81B, 81C, 81D, and 81E turning in a zigzag directions as shown in FIG. 8. The average slope of the first filling line 81 may be the average of slope values of the first line 81A, third line 81B, and fifth line 81C.

Even though an example of deciding the direction of gradation based on the average slope of the first filling line 81 is illustrated in FIG. 8, the embodiment of the present disclosure may decide the direction of gradation by measuring all the slopes of the filling line 81 having the first color to the filling line 83 having the third color, and by calculating the average value of the slopes.

FIG. 9a is a screen example illustrating a method for applying a graphic effect to a text according an embodiment of the present disclosure.

Referring to FIG. 9a, another embodiment of the present disclosure may apply a graphic effect to a text. For example, a user may input a filling line on a text to be applied with a graphic effect as shown in the drawing of reference number 910 of FIG. 9a. If the input of the filling line is completed, the control unit 110 may apply a graphic effect on the text as shown in the drawing of reference number 920.

Here, the text may include a text typed through a keyboard or a keypad and a script text input through the touch screen 130 or a touchpad. In the meantime, if an image and a script text exist together, the control unit 110 may apply the graphic effect only to the script text by distinguishing the text from the image through a text recognition function.

FIG. 9b is a screen example illustrating a method for applying a graphic effect to an icon according an embodiment of the present disclosure.

Referring to FIG. 9b, another embodiment of the present disclosure may apply a graphic effect to an icon 90. For example, a user may input a filling line on the icon 90 to be applied with the graphic effect as shown in the drawing of reference number 930 of FIG. 9b. If the input of filling line is completed, the control unit 110 may apply a graphic effect to the icon 90 as shown in the drawing of reference number 940. Here, even though the filling line is drawn to the outside of the icon area 90, the control unit 110 may apply the graphic effect only to the icon 90.

FIG. 9c is a screen example illustrating a method for applying a graphic effect to a partial object of an image according another embodiment of the present disclosure.

Referring to FIG. 9c, another embodiment of the present disclosure may apply a graphic effect to an object included in an image. For example, a user may select an object 91 to be applied with the graphic effect from the image including a plurality of objects as shown in the drawing of reference number 950 of FIG. 9c. For this, the electronic device 100 may include an object recognition function.

The user may input a filling line 92 on the selected object 91 as shown in the drawing of reference number 960. If the input of filling line 92 is detected, the control unit 110 may apply a graphic effect to the selected object 91 corresponding to the attribute of the input filling line 92 as shown in the drawing of reference number 970.

Even though an example of selecting an object is illustrated in FIG. 9c, the embodiment of the present disclosure may apply a graphic effect by selecting a plurality of objects.

FIG. 9d is a screen example illustrating a method for applying a graphic effect to a whole image according another embodiment of the present disclosure.

Referring to FIG. 9d, another embodiment of the present disclosure may apply a graphic effect to a whole image. For example, if an input of filling line 93 is detected on a specific image (for example, a photo) as shown in the drawing of reference number 980 of FIG. 9d, the control unit 110 may apply a graphic effect to the whole specific image corresponding to the attribute of the filling line 93 as shown in the drawing of reference number 990.

As described above, the method for applying a graphic effect in an electronic device according to the embodiments of the present disclosure may be provided in a form of program command executable through various computer means and recorded in a non-transitory recording media readable by a computer. Here, the recording media readable by a computer may include a program command, data file, data structure, and any combination thereof. In the meantime, the program command recorded in the non-transitory recording media may be one specially designed for the embodiments of the present disclosure or one disclosed in the art of computer software. The non-transitory recording media readable by a computer may include hardware devices specially designed to store and execute programs such as magnetic media (hard disk, floppy disk, and magnetic tape), optical media (Compact Disc-Read Only Memory (CD-ROM) and Digital Versatile Disc (DVD)), magneto-optical media (floptical disk), Read Only Memory (ROM), Random Access Memory (RAM), and flash memory. Further, the program command may include a high level language code executable by a computer having an interpreter as well as a machine language code provided by a complier. The hardware device may be configured with at least one software module to perform operations according to various embodiments of the present disclosure.

While the present disclosure has been shown and described with reference to various embodiments thereof, it will be understood by those skilled in the art that various changes in form and details may be made therein without departing from the spirit and scope of the present disclosure as defined in the appended claims and their equivalents.

The invention claimed is:

1. A method for applying a graphic effect in an electronic device, the method comprising:
receiving an input of a filling line drawn on an image displayed on a screen of the electronic device, the filling line indicating attribute information of a graphic effect to be applied to at least a partial area of the displayed image;
identifying an attribute of the filling line based on a density of the filling line drawn on the displayed image; and
applying the graphic effect corresponding to the identified attribute of the filling line to at least the partial area of the displayed image,
wherein the applying of the graphic effect comprises applying a first brightness value to all pixels within a first area of the displayed image in which the density of the filing line is a first density value and applying a second brightness value different from the first brightness value to all pixels within a second area of the displayed image in which the density of the filling line is a second density value different from the first density value.

2. The method of claim 1, wherein the applying of the graphic effect further comprises applying a gradation effect to at least the partial area of the displayed image.

3. The method of claim 2, wherein the identifying of the attribute of the filling line further comprises identifying a slope of the filling line.

4. The method of claim 1, further comprising:
identifying an object from the displayed image; and
receiving a selection of a specific object from the displayed image,
wherein the applying of the graphic effect to at least the partial area of the displayed image comprises applying the graphic effect corresponding to the filling line only to the selected specific object.

5. The method of claim 1, further comprising:
receiving an input of another filling line from an area displayed with a text;
identifying an attribute of the other filling line; and
applying a graphic effect corresponding to the identified attribute of the other filling line to the text.

6. The method of claim 1, further comprising:
dividing an area according to an outline of the received filling line; and
applying the graphic effect to the divided area.

7. The method of claim 1, wherein the applying of the graphic effect is performed when a predefined command is input after receiving the input of the filling line, or is automatically performed after a predetermined time elapses if the filling line is input in the state of activating a graphic effect apply mode.

8. The method of claim 1,
wherein the identifying of the attribute of the filling line further comprises identifying a color of the filling line, and
wherein the applying of the gradation effect comprises:
receiving an input of at least two filling lines each having different colors than each other, and
applying the gradation effect by changing the color based on a boundary of the at least two filling lines.

9. An apparatus for applying a graphic effect in an electronic device, the apparatus comprising:
a display configured to display an image;
an inputter configured to input a filling line drawn on the displayed image, the filling line indicating attribute information of a graphic effect to be applied to at least a partial area of the displayed image; and
at least one processor configured to:
identify an attribute of the input filling line based on a density of the filling line drawn on the displayed image,
apply the graphic effect corresponding to the attribute of the filling line to at least the partial area of the displayed image,
apply a first brightness value to all pixels within a first area of the displayed image in which the density of the filing line is a first density value, and
apply a second brightness value different from the first brightness value to all pixels within a second area of the displayed image in which the density of the filing line is a second density value different from the first density value.

10. The apparatus of claim 9, wherein the graphic effect further comprises a gradation effect.

11. The apparatus of claim 10, wherein the at least one processor is further configured to identify the attribute of the filling line by identifying a slope of the filling line.

12. The apparatus of claim 9, wherein the at least one processor is further configured to:
receive a selection of a specific object from the displayed image, and
apply the graphic effect corresponding to the filling line only to the selected specific object, if the selection of the specific object is received from the displayed image.

13. The apparatus of claim 9, wherein the at least one processor is further configured to apply, if the filling line is input on a text included in the displayed image, the graphic effect corresponding to the identified attribute of the filling line to the text.

14. The apparatus of claim 9, wherein the at least one processor is further configured to:
- divide an area according to an outline of the received filling line, and
- apply the graphic effect to the divided area.

15. The apparatus of claim 9, wherein, if an input of the at least two filling lines respectively having different colors is received, the at least one processor is further configured to:
- identify the attribute of the filling line by identifying a color of the filing line, and
- apply a gradation effect by changing a color based on a boundary of at least two filling lines.

\* \* \* \* \*